L. A. GRANOUX.
APPARATUS FOR PRODUCING ELECTRIC CONTACTS AT ADJUSTABLE PERIODIC INTERVALS.
APPLICATION FILED MAY 1, 1912.

1,083,486.

Patented Jan. 6, 1914.
2 SHEETS—SHEET 1.

UNITED STATES PATENT OFFICE.

LOUIS ANTOINE GRANOUX, OF MARSEILLE, FRANCE.

APPARATUS FOR PRODUCING ELECTRIC CONTACTS AT ADJUSTABLE PERIODIC INTERVALS.

1,083,486.  Specification of Letters Patent.  Patented Jan. 6, 1914.

Application filed May 1, 1912.  Serial No. 694,335.

*To all whom it may concern:*

Be it known that I, LOUIS ANTOINE GRANOUX, citizen of the Republic of France, residing at Marseille, France, have invented new and useful Improvements in or Relating to Apparatus for Producing Electric Contacts at Adjustable Periodic Intervals, of which the following is a specification.

This invention relates to an apparatus intended to produce at periodical intervals, the length of which is adjustable at will, one or more electric contacts so as to effect, according to the application of the apparatus, the operation of a suitable more powerful electric device which, in its turn, can start or stop any mechanism which must be operated at regular intervals, such as light eclipsing apparatus, a grate furnace with oscillating bars, etc.

The apparatus comprises in principle, an indicator adjustable at will on a sector provided with measurement divisions for time, on which a member travels at a constant speed, the amplitude of movement of which is regulated by the position of the said indicator. This movable part preferably returns to its starting point instantaneously, but it can also return to it at the same speed as that of its forward movement, or with a smaller or greater speed.

In order to make the invention clear, this specification is accompanied by a drawing, merely by way of example, in which—

Figure 1:
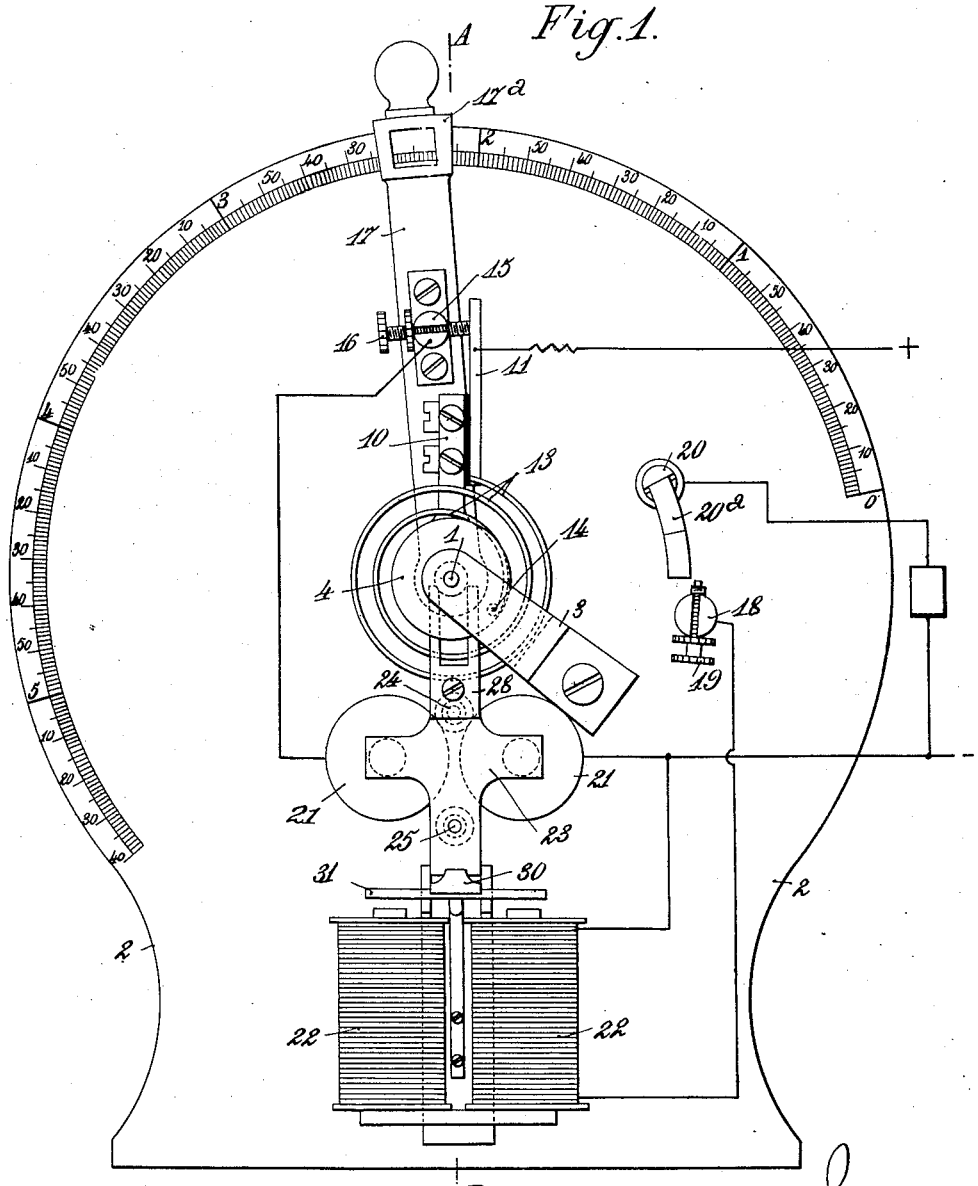
Figure 2:
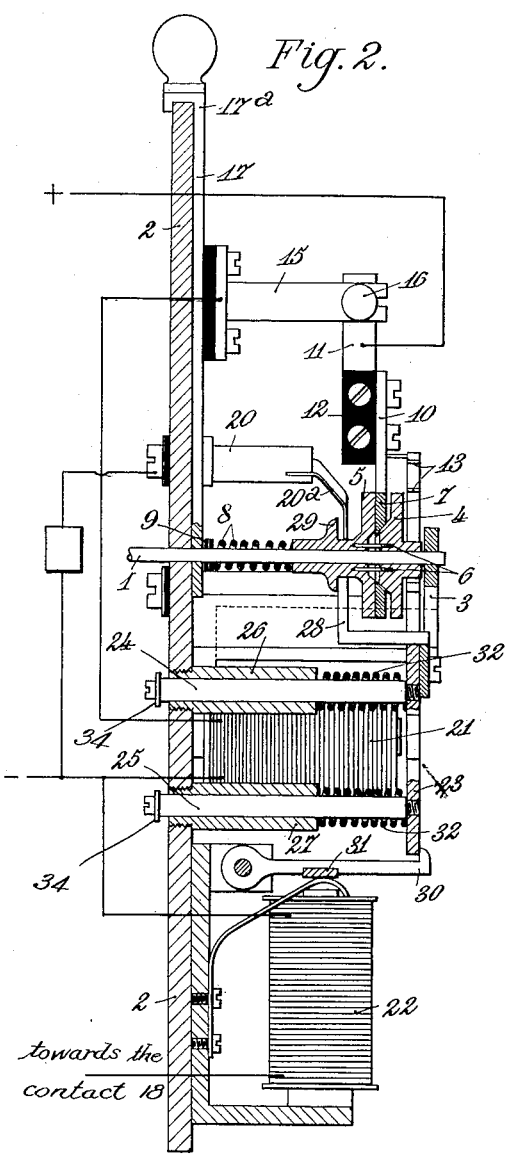

Figure 1 shows the apparatus in front elevation, while Fig. 2 is a vertical cross-section on line A—B of Fig. 1.

In the said drawing, a pin or spindle 1 is driven by a clockwork and rotates at a constant speed adjusted once for all according to the application of the apparatus. The clockwork which is not shown, is arranged on the rear face of the plate 2 which forms the frame of the apparatus, and the upper part of which is cut out in the shape of a sector and provided on its face with graduations indicating time. In the example illustrated, the maximum length of time during which a part can move on the face of the plate 2, cannot exceed five minutes and forty seconds.

The spindle 1 passes freely through the frame 2 and its front end is pivoted in a suitably bent metal bracket 3. The part of the spindle 1 comprised between the frame 2 and the bracket 3, has rigidly fast to it a disk 4. A second disk 5 can slide on the spindle, but is connected to the disk 4 by two small tenons 6 which force it to participate in the movement of rotation imparted to the disk 4 by the spindle 1. Between the said two disks 4 and 5, one of which is provided on one of its faces with a conical extension, is inserted an aluminium ring 7, one face of which is suitably shaped in its central portion to enable it to engage with the cone of the disk 4. A helical spring 8 compressed between the movable disk 5 and a washer 9 secured to the spindle 1, has the tendency to keep the ring 7 constantly compressed between the two disks 4 and 5 in order to force it to take part in their movement of rotation. The ring 7 is provided with a finger 10 to which is secured a rod 11 of suitable rectangular cross-section also of aluminium, electrically insulated from the finger 10 and the ring 7 by a plate 12 of ivory or other suitable material.

The ring 7 is constantly exposed in the direction opposite to that of the rotation of the spindle 1, to the action of a spiral spring 13, the ends of which are connected, on the one hand, to the finger 10, and on the other hand, to the projection 14 provided on the back of the bracket 3. The tension of the said spring 13 is sufficient to drive the very light ring 7 as soon as the latter ceases to be compressed between the disks 4 and 5, but its action is too weak to interfere with that of the clockwork.

The rod 11 participating in the movement of the spindle 1, at a given moment meets an electrical terminal 15 provided with a micro-metric screw 16 with a platinum tip. This terminal 15 is secured to a radial indicator or hand 17 which can be moved by hand about the spindle 1 on the frame 2. The outer end of the hand 17 is preferably perforated and provided with an index 17ª the position of which on the limb of the frame 2 determines the length of time at which the electric contact or contacts of the apparatus must be closed. The duration of the interval in Fig. 1 is two minutes eight seconds, the reading being made in the opening from the right-hand inner margin of the index 17ª. A terminal 18 secured to the frame 2 and electrically insulated is also provided with a micro-metric screw 19 with a platinum tip. This screw 19 forms a stop for the rod 11 when the latter, on being disengaged from the disks 4 and 5 is exposed only to the action of the spiral spring 13 acting in opposition to that of the spindle 1. The said screw 19 is arranged so that, on contact with it, the rod 11 should be in position on the O of the limb. The graduation of the limb corresponds to the advance of the rod 11 at the speed imparted by the spindle 1 driven by the clockwork. An electric terminal 20 secured to the frame 2 from which it is insulated, carries a flexible blade 20ª, or any other contact part sufficiently flexible not to oppose the angular movement of the rod 11 under the action of the spring 13.

The object of the apparatus is to send at regular time intervals regulated by the position of the index 17 on the limb of the frame 2 an electric current into the terminal 20 connected to the conductor used for supplying any electric apparatus which must be controlled direct or by means of relays. The rod 11 is electrically connected by flexible wire or in some other way, to one of the poles of the current, the other pole of which passes through the electromagnet 21 and terminates at the terminal 15 of the hand 17. The pole controlling the electro-magnet 21, passes through the electro-magnet 22 and terminates at the terminal 18. The terminal 20 completely insulated, is electrically connected to one of the poles of the apparatus to be controlled, the other pole of which is connected to the conductor used for distributing current to the electro-magnets 21 and 22. When the rod 11 of the ring 7 driven by the disks 4 and 5 comes into contact with the terminal 15 the current passes into the electro-magnet 21 which attracts a soft iron armature 23 guided by means of the two rods 24 and 25 sliding in two sockets or sleeves 26 and 27. To the armature 23 is secured a right angle part 28 terminating in a disengaging fork and intended to act on the circular collar 29 of the disk 5. The attraction of the electro-magnet 21 moves therefore the disk 5 away from the ring 7, the spring 8 being compressed. The ring 7 being released from the compression between the two disks 4 and 5 will immediately be controlled by the spiral spring 13.

The contact between the rod 11 and the terminal 15 ceases at once, but the armature 23 in its movement toward the soft iron core of the electro-magnet 21, has engaged with the pawl 30 which prevents it, after the breaking of the said circuit in the electro-magnet 21, from returning to its original position. Owing to that, the ring 7 continues to be controlled by the spring 13 and makes contact by friction with the blade 20ª of the terminal 20 and meets the stop 19 of the terminal 18. This contact closes the circuit of the electro-magnet 22 which attracts the armature 31 secured to the pawl 30 and disengages the armature 23 which obeying the action of the springs 32 drives the fork 21 and releases the disk 5 which again presses the ring 7 against the disk 4 and brings about its driving toward the terminal 15, on contact with which the operation recommences. During the contact of the rod 11 with the blade 20ª the current passes into the apparatus to be operated. The movement away of the armature 23 is limited by an annular stop 34 secured to each of the rods 24 and 25 by a screw, the position of which stop can be adjusted by inserting washers.

As the disengagement produced when the rod 11 comes into contact with the terminal 15 sends a current into the line controlling the apparatus to be operated through the terminal 20, it is clear that the moment of this disengagement depends on the terminal 15, and consequently on the angular position of the hand 17 on the dial or frame 2, and that the time elapsing between each emission of current, varies in accordance with that position.

The parts, the working of which has been described, are set forth merely by way of example, the essential principle of the invention consisting in the application of a member describing, within a given time which can be varied at the will of the operator, a variable angle at a suitable speed regulated once for all between two stops, the angular distance between which corresponds according to the indications of the divisions of a dial or sector, to the determined length of time.

Having now particularly described and ascertained the nature of my said invention and in what manner the same is to be performed, I declare that what I claim is:

1. Apparatus for making electric contacts at adjustable periodic intervals, comprising in combination, a spindle rotating at a constant given speed, and adapted to pass through the frame of the apparatus, a contact lever rotating around said shaft, a flexible blade upon a terminal secured to the frame of the apparatus, electrical apparatus connected to said terminal, clutch means for swinging said contact lever with a predetermined speed across said contact blades, two contacts limiting the oscillation of said contact lever, means connected to said limiting contacts causing a change in the direction of movement of said lever, and means for determining the length of the oscillating time period.

2. Apparatus for making electric contacts at adjustable periodic intervals, comprising in combination, a spindle rotating at a constant given speed, and adapted to pass through the frame of the apparatus, a contact lever rotating around said shaft, a flexible blade upon a terminal secured to the frame of the apparatus, electrical apparatus connected to said terminal, clutch means for guiding said contact lever with a predetermined speed across said contact blades, two contacts limiting the oscillation of said contact lever, electro-magnets connected to said limiting contacts for causing a change in the direction of movement of said lever, and an index arm for determining the length of the oscillating time period.

In testimony whereof I affix my signature in presence of two witnesses.

LOUIS ANTOINE GRANOUX.

Witnesses:
 A. GRANOUX,
 H. BARRAGUE.